Aug. 29, 1944.  W. T. GOLLWITZER  2,356,995
PRINTING MACHINE
Original Filed July 28, 1938  9 Sheets-Sheet 2

Inventor:
Walter T. Gollwitzer,
By: Wallace and Cannon
Attorneys

Aug. 29, 1944.  W. T. GOLLWITZER  2,356,995
PRINTING MACHINE
Original Filed July 28, 1938   9 Sheets-Sheet 6

Inventor
Walter T. Gollwitzer
By Wallace and Cannon
Attorneys

Aug. 29, 1944. W. T. GOLLWITZER 2,356,995
PRINTING MACHINE
Original Filed July 28, 1938 9 Sheets-Sheet 9

Inventor:
Walter T. Gollwitzer,
By Wallace & Cannon
Attorneys

Patented Aug. 29, 1944

2,356,995

UNITED STATES PATENT OFFICE 2,356,995

PRINTING MACHINE

Walter T. Gollwitzer, Euclid, Ohio, assignor to Addressograph-Multigraph Corporation, Wilmington, Del., a corporation of Delaware Original application July 28, 1938, Serial No. 221,841. Divided and this application October 16, 1941, Serial No. 415,318

6 Claims. (Cl. 101—19)

This application is a division of my co-pending application Serial No. 221,841, filed July 28, 1938, now issued as United States Letters Patent No. 2,296,277, patented September 22, 1942.

The present invention relates to printing machines of the kind in which impressions are made directly from printing and control devices or the like fed sequentially through the machine and wherein other impressions are made indirectly under the control of such devices, and this invention more particularly pertains to apparatus for recording variable data under control of such devices.

In printing machines of the aforesaid character the variable data printing apparatus, or variable printer as it is commonly referred to in the art, is set up by a variantly settable governing means which is in turn responsive to data representations such as perforations, tabs, or other suitable control indicia afforded on the printing and control devices. Thus, in the printing of instruments such as bills or checks the printing and control devices may be provided with representations of numerical data which are related to other data, hereinafter referred to as changeable data, that are printed directly from printing means such as embossed type characters or the like carried by the printing and control devices.

For example, in the printing of dividend checks, each printing and control device may bear printing means for making an impression of the name and address of a particular shareholder in the corporation which is issuing the check, and such device is also provided with a control area in which there may be represented the amount of the dividend payable to the shareholder or perhaps merely the number of shares of stock owned by him. Then, as each printing and control device passes through the machine, the control area thereon is sensed by suitable sensing means and the variantly settable governing means is operated under control of the sensing means to set up the variable printer for printing variable data upon the check sheet or the l ke. Such governing means may be arranged to set up the variable printer for printing the numerical data such as a dividend amount represented on the corresponding printing and control device, as is disclosed in my United States Patent No. 2,133,136, or it may be adapted to interpolate such data as by ascertaining the product of the number of shares of stock times the dividend rate in the manner shown in my co-pending application, Serial No. 221,841, now Patent No. 2,296,277, patented September 22, 1942. In any event the variable data which the variable printer is set up to print has a definite relation to the numerical data represented on the printing and control device, and in the particular example set forth hereinabove such variable data constitute the amount of the dividend payable to the shareholder whose name and address are printed from the related printing and control device.

Where instruments such as checks are being printed with the amounts of money owing to designated persons, it is of course desirable to insure against the possibility that the printed amounts may be subsequently altered so as to extend into higher denominations than was originally intended. Customarily the "raising" of printed amounts in this manner is prevented by printing blanking characters such as dollar signs, stars or other symbols to the left of the highest significant digit in the amount. To this end, certain of the type-carrying members included in the means for printing such amounts are provided with blanking characters in addition to the digit symbols carried by these members, and the arrangement is such that the members in all denominations higher than the printed are adjusted to a predetermined position which is different than the position which they would occupy if zeros were to be printed therefrom, to thereby dispose the blanking characters thereon in printing position. There may be instances, however, where other variantly settable elements such as recording punches or accumulator racks are interconnected with the printing members to be set up concurrently therewith by the governing means, and it may not be feasible to dispose any of these other elements in positions other than their zero-representing positions in instances where the corresponding printing members are not set up to print significant digits. Hence, it is essential that the adjustment of a printing member in the variable printer to a special position for printing a blanking character shall not affect the zero setting of the associated variantly settable element.

Therefore, an object of this invention is to enable variantly settable elements such as recording punches or punch selecting members to be generally set up conjointly with the printing members under control of a common governing means and to also afford independent adjustment or set up movement of the printing members alone when the printing of blanking characters in numerical amounts is involved.

Further objects are to arrange a series of slidable elements under control of a variantly settable governing means for effecting the selective positioning of recording members such as punches or punch selecting members and concurrently therewith the setting up of printing members such as type wheels for printing variable data, particularly numerical data; to interconnect the printing members and slidable elements in such a manner as to enable limited relative movement thereof for disposing blanking characters on the printing members in impression-making position without affecting the settings of the slidable elements; to selectively adjust or set the printing members to their blanking positions in acordance with the value of the numerical amount to be printed; and to enable such setting up of the printing members to be accomplished in a more rapid and efficient manner than has been heretofore possible in apparatus of this character.

A still further object is to improve the construction of variable printers and associated variantly settable mechanisms in printing machines and more particularly to afford a novel control for the printing of special symbols such as blanking characters.

Other objects are to arrange the various type segments of the variable printer respectively adjacent a corresponding series of related gear segments, all of said segments being rotatably mounted in side-by-side relation on a common shaft; to interconnect the various gear segments with corresponding rectilinearly movable sensing bars by means of racks provided on said bars; to render the sensing bars responsive to the respective settings of the differentially settable elements of an amount manifesting means for thereby selectively adjusting the positions of the bars to represent the digital values of an amount, whereby the interconnected gear segments are displaced rotatively in a corresponding manner; and to afford adjustable interconnections between the related gear and type segments, thereby enabling accurate positioning of the type characters at the printing line.

Still another object is to provide accurately located teeth or notches in the gear segments and to arrange a common knife bar for cooperation with such teeth or notches to thereby properly align the type characters in printing position.

Other and further objects of the present invention will be apparent from the following description and claims and will be understood by reference to the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 1:
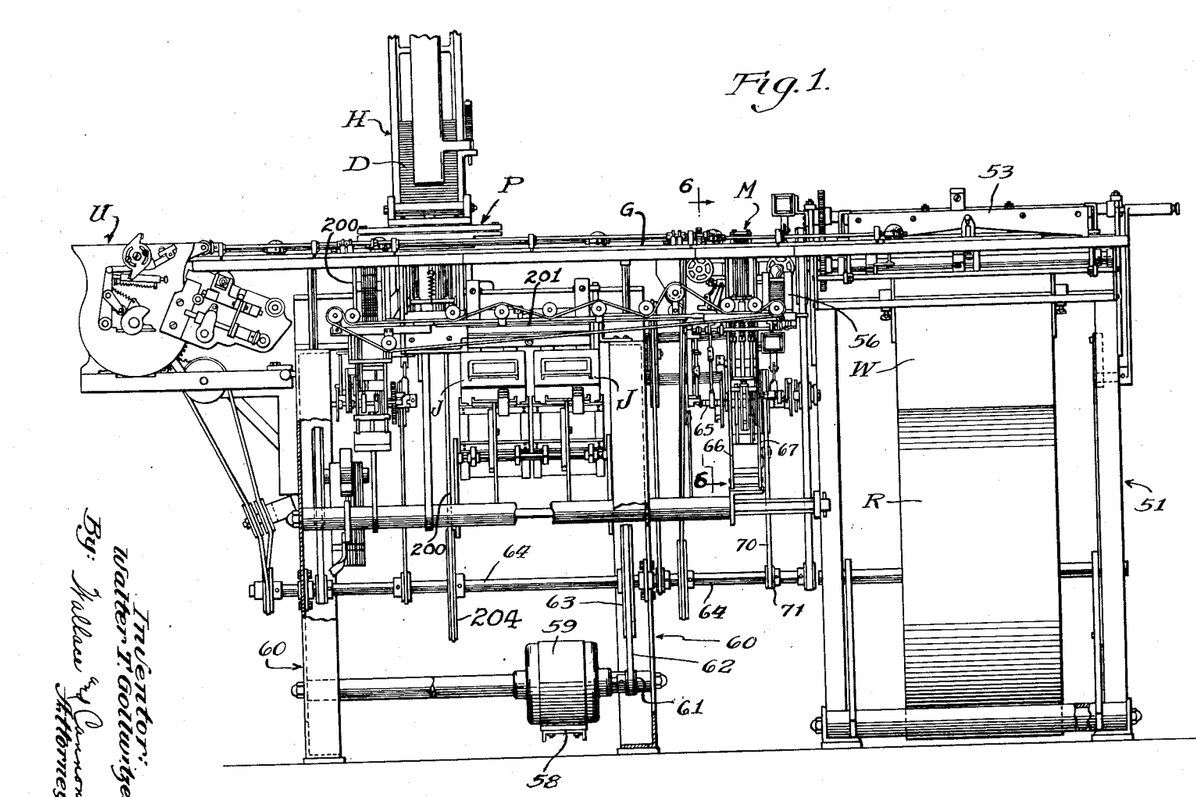
Fig. 1 is a front elevation of a machine in which the present invention is included.
Figure 4:
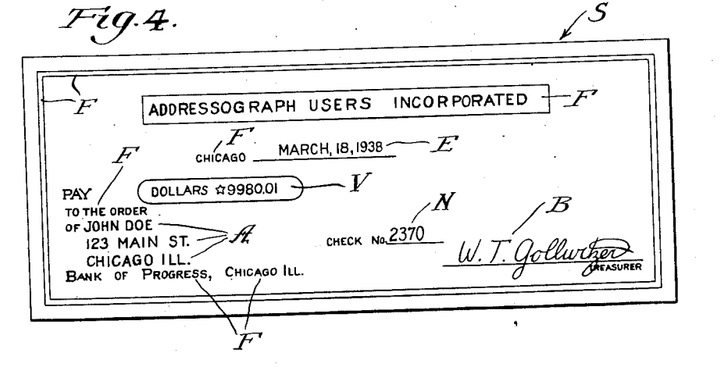
Fig. 4 is an elevation of a typical business instrument produced by the machine illustrated in Fig. 1.

The present invention is utilized, for example, to print an amount as V on a check or the like as S, Fig. 4, which is advantageously produced in a machine such as that shown in Fig. 1 and in which machine the present invention is particularly useful. The check or sheet S includes constantly recurring data, constituting a form F, which in the present instance is the name and location of the company issuing the check, the words "Check No.," the name of the bank on which the check is drawn, and kindred data imparting characteristics to the check, including the border appearing thereon; changing data A, constituting an indentification and specifically characterizing the check and, in the present instance, this is an address comprising a name, street and number, and city and state; variable data V which are the amount for which the check is to be payable; and other analogous data such as a date E, a number N and a signature B. The date E and signature B are the first data, in the machine as constructed, to be printed; next the variable data V are printed and thereafter the address A and number N are printed; and finally the form F is printed on the check. The present invention particularly relates to the printing of the variable data V on the check.

Figure 2:
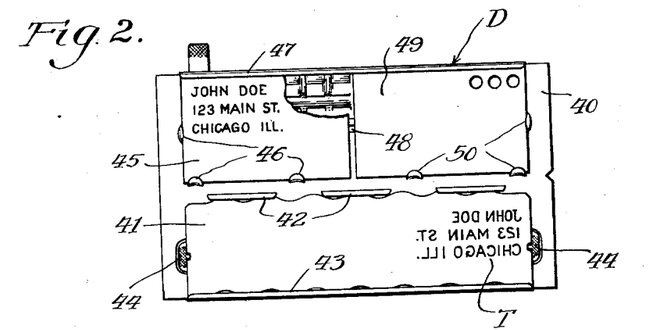
Fig. 2 is an elevation of a typical printing and control device which may be utilized in the aforesaid machine.

The address, or changeable data A, is printed on the check directly from a printing and control device such as the device D, Fig. 2, and the variable data V are printed indirectly under control of such a printing and control device. It is to be understood, however, that when reference is made hereinafter to a printing and control device, this term is to be considered generic for, as will be apparent to those skilled in the art, the means in the machine which are responsive to the control areas on printing and control devices could be responsive to perforations or other data-representing means provided on record cards or the like. In view of this it is to be understood that while the devices will be described as printing and control devices, this term is used in the generic sense hereinafter.

Figure 3:
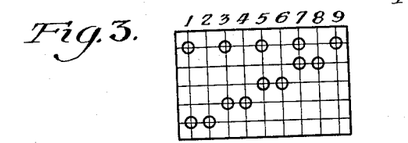
Fig. 3 is a chart of a code according to which control indicia are formed in the printing and control devices.

The printing and control device D shown in Fig. 2, which is typical of such devices, includes a carrier or, as it is called in the art, a frame 40 having, in this instance, a metallic plate 41 removably retained hereon by fixed retaining devices 42, a bead 43 at the lower edge of the frame, and yieldable or depressible retaining tongues 44. When one or the other of the tongues 44 is depressed, the plate 41 may be slid endwise from the retaining devices 42 and the bead 43. Type characters T are, in this instance, embossed in the metallic plate 41 so as to appear in relief on one face thereof and in intaglio on the opposite face, impressions being made from the relief faces of the type characters T when the printing and control device D is fed into printing relation with the platen P, Figs. 1 and 5, in the machine. The printing and control device D shown in Fig. 2 also bears an identification card 45 on which an impression is made from the type characters T so that the data that are thus printed from these type characters may be read easily, thus facilitating handling of the device D. This card 45 is removably retained on the frame 40 above the plate 41 thereon by suitable retaining devices 46 and a bead 47, and by retaining devices 48 interposed between the card 45 and another card 49 which is also removably retained on the frame 40 by retaining devices 50 and the bead 47. The card 49 and underlying portion of the frame 40 are adapted to have perforations formed therein in accordance with the code shown in Fig. 3 so as to afford control means or representations of data, and such perforations or control means are utilized in the production of the variable data V on the check S, Fig. 4, in a manner that will be explained hereinafter. The perforations in the control card 49 and the underlying portion of the frame 40 may be conveniently produced in a machine such as that disclosed in my co-pending application Serial No. 210,897, filed May 31, 1938, now Patent No. 2,265,229, patented December 9, 1941.

In the machine shown in Fig. 1, the dividend check or sheet S is severed from a web W, Fig. 1, that is withdrawn from a roll R which is rotatably supported in a stand 51 positioned at one end of the machine. The web W is led from the roll R to suitable web withdrawing devices contained within the housing 52, Fig. 2, such devices being shown and described in detail in my co-pending application Serial No. 239,562, filed November 8, 1938, now Patent No. 2,288,350, patented June 30, 1942. During passage of the web through the devices in the housing 52 the date E and signature B are printed thereon, the manner in which such printing is done being described in my aforesaid co-pending application Serial No. 221,841. Subsequently a portion of the web bearing these impressions is extended beyond a severing device including the knife 53, Fig. 1, and upon operation thereof the check or sheet S is severed from the web W and is deposited in the sheet guideway G, Fig. 1.

Once the sheet is deposited in the guideway G it is under control of sheet feeding and stopping devices such as are disclosed in my United States Patent No. 2,211,772. These devices serve to position the sheet in association with the variable printer governed by the variantly settable means or multiplying apparatus M, and movement of the sheet is interrupted while it is at such position to enable an impression of variable data V, Fig. 4, to be made thereon.

The apparatus to which the present invention particularly pertains is operated under control of the multiplying mechanism M in a manner that will be described presently, and after this apparatus has functioned to print the variable data V on each check as S the sheet feeding and stopping devices advance the sheet from the multiplying mechanism M into a position with respect to the platen P where the address A and the like are printed on a check or sheet S from the printing and control device D that is at that time disposed in printing position beneath the platen P, the manner in which the devices as D are advanced to printing position being described presently.

In many instances a proof sheet is passed beneath the platen P and when this is done the platen P is also effective to make an impression from each printing and control devices D onto the proof sheet. The manner in which such a proof sheet may be fed into position to have such impressions made thereon is disclosed in my co-pending application Serial No. 320,778, filed February 26, 1940.

Moreover, the platen P is effective to make impressions on the proof sheet from settable type segments controlled by the auxiliary printing mechanism 200, Fig. 1, which, for example, may be of the nature disclosed in my copending application Serial No. 423,119, filed December 15, 1941. This variable printing mechanism is set up under control of cards C, Fig. 18, that are produced in the course of operation of the multiplying mechanism M as will be described more fully hereinafter, these cards advancing from the multiplying mechanism M along the card guideway 201, Fig. 1, to the auxiliary printing mechanism to control set-up thereof and after the cards pass from the auxiliary printing mechanism they are deposited in a suitable collector not shown.

After the sheets as S have had an impression made thereon by the platen P the aforesaid sheet feeding and stopping devices cause each sheet to be advanced into the form printing unit U, Fig. 1, where the form F and the like, Fig. 4, are printed on each sheet.

The various units of the machine such, for example, as the multiplier M, the auxiliary printing mechanism 200 and the form printing unit U are driven from a main drive shaft 64 and each unit is brought into operation at a predetermined time in the course of the machine under control of a clutch interposed between the mechanism and the means receiving power from the drive shaft 64 that is associated with each such operative mechanism, this arrangement being described in detail in my copending application Serial No. 416,635, filed October 27, 1941.

In the present instance the drive shaft 64 is driven at all times when the machine is in operation and power is supplied to this shaft from an electric motor 59, Fig. 1, carried by a bracket 58 suitably supported on the frame 60 of the machine. A belt 62 is passed about a pulley 61 on the drive shaft of the motor 59 and about a pulley 63 fast on the drive shaft 64. The various operating units each includes a pulley about which a belt is passed and such belt is also passed about a pulley on the drive shaft 64.

Figure 5:
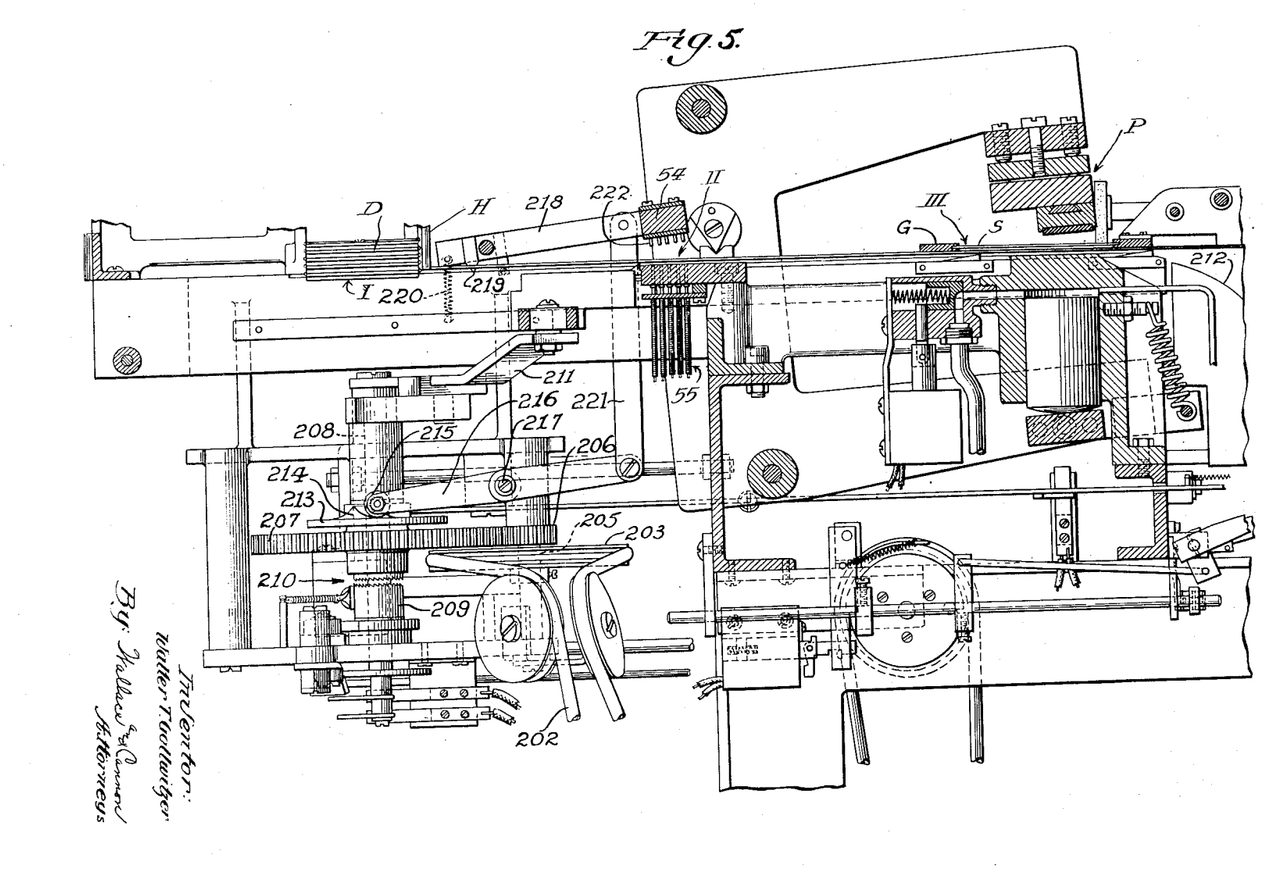
Fig. 5 is a vertical sectional view through the printing and control device guideway.

Thus, for example, the means for advancing the printing and control devices as D through the machine is driven by a belt 202, Figs. 1 and 5, this belt being passed about a pulley 203, Fig. 5, associated with the means for advancing the printing and control devices through the guideway through which such devices are advanced from the magazine or holder H in which the devices are placed when they are introduced into the machine. The belt 202 also passes about a pulley 204, Fig. 1, fast on the drive shaft 64.

The pulley 203 is fast on a shaft 205, Fig. 5, which has a pinion 206 fast thereon that meshes with a gear 207 that is rotatably mounted on the shaft 208. A collar 209 is slidably but non-rotatably mounted on the shaft 208 and is part of a clutch generally indicated by 210 which, when engaged, connects the shaft 208 with the gear 207 and therefore the pinion 206 and pulley 203 so that the shaft 208 is driven from the drive shaft 64.

In the manner described in full detail in my copending application Serial No. 415,317, filed October 16, 1941, the shaft 208 is effective to impart a reciprocatory movement to the arm 211 which, through the intermediary of devices described in full detail in my last referred to copending application, is effective to advance the lowermost printing and control devices from station I at the magazine H first to station II beneath a sensing means referred to hereinafter, and then to a station III beneath the platen P, after which the printing and control devices pass through a discharge passage 212 to thereafter be selectively returned to one or the other of the devices receiving drawers J, Fig. 1, in the manner described in full detail in my copending application, Serial No. 403,272, filed July 21, 1941.

By referring to Fig. 2 it will be seen that each printing and control device D includes a control card as 49 and aligned perforations formed in this card and the underlying portion of the frame 40 of each printing and control device D represent a numerical amount, as described hereinabove. At the time each printing and control device is disposed at station II, the sensing head 54 is lowered into association with the portion of the printing and control device D at station II, whereat the numerical providing representations are formed. In order to insure that the sensing head 54 will be moved into sensing association with a printing and control device at station II during an at rest interval in the step-by-step advancing move of the printing and control device through the guideway therefor, the movement of the sensing head 54 is effected by means of a cam 213, Fig. 5, fast on the shaft 208 to be rotatable therewith. This cam has a formed portion 214 thereon which, during rotation of the shaft 208, moves into engagement with a roller 215 mounted at one end of a rocker 216 that is pivotally mounted, as indicated at 217, on the housing 4 of the shaft 205. The sensing head 54 is carried at the end of a pair of arms as 218 which pivot about knife edge pivots as 219 and springs as 220 effective on the arms as 218 normally hold the sensing head 54 in the inoperative position thereof shown in Fig. 5. When, however, the formed portion 218 engages the roller 215 the end of the rocker 216 opposite that carrying the roller 215 is pivoted downwardly, and through the intermediary of the link 221 this is effected to move the sensing head 54 into sensing position. The sensing head 54 has sensing pins 222 therein which are disposed to be respectively aligned with positions whereat data representing perforations may be formed in a printing and control device D and when the sensing head 54 is moved into sensing position those pins 222 which are aligned with perforations in the printing and control device D at sensing station II pass through such perforations and are effective to push aligned of the Bowden cables 55. The Bowden cables are directed to the multiplying mechanism M and in the manner described in my copending application Serial No. 313,146, filed January 9, 1940, now Patent No. 2,296,276, patented September 22, 1942. These pushed of the Bowden cables control the set up of the multiplying mechanism M in such a way as to determine the manner in which the settable type carrying members of the present apparatus are arranged so as to print the variable data V disposed in position to receive an impression from these type segments, this occurring when the sheet is associated with the multiplying mechanism M, as described hereinabove.

The multiplying apparatus M has a main cam shaft 65, Figs. 1, 6, 8, and 14, which is journaled in the side frames 66 and 67 of the apparatus M. In the operation of the machine the shaft 65 is intermittently coupled to a pulley 68, Fig. 8, by a solenoid-operated clutch 69 of the character shown in my copending application Serial No. 239,561, filed Nov. 8, 1938, now Patent No. 2,265,133, patented December 9, 1941. A belt 70 passes about the pulley 69 and about a pulley 71, Fig. 1, on the main drive shaft 64 so that the pulley 68 is constantly driven by the motor 59. The clutch 69 is periodically actuated in timed relation with the operation of other parts of the machine, and each time it is rendered effective it causes the cam shaft 65 to be driven through one complete revolution to thereby send the multiplying apparatus M through a cycle of operation, in the course of which the printing of the variable data V, Fig. 4, is effected.

Figures 6, 7:
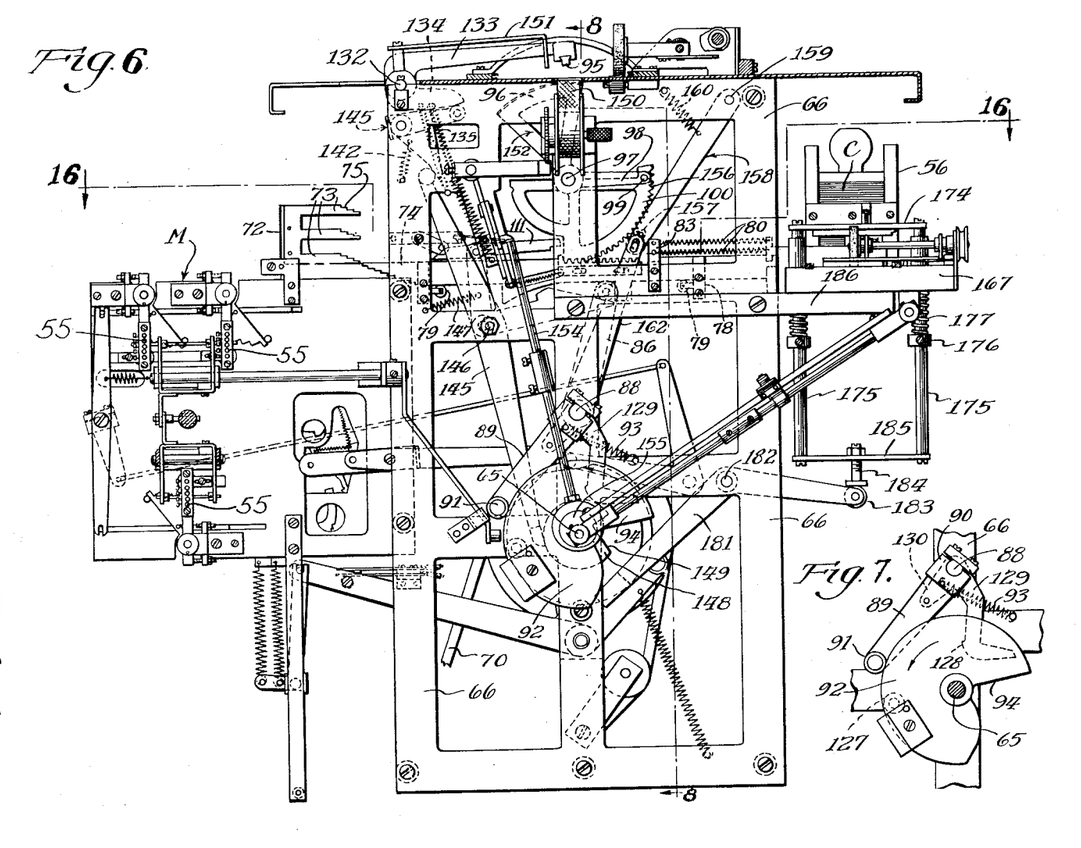
Fig. 6 is a side view of a variantly settable apparatus including the variable printer in which the present invention is embodied, this view being taken on the line 6—6 on Fig. 1.
Fig. 7 is a fragmentary detail view of a cam and cam follower employed in the mechanism shown in Fig. 6.
Figures 16, 17:
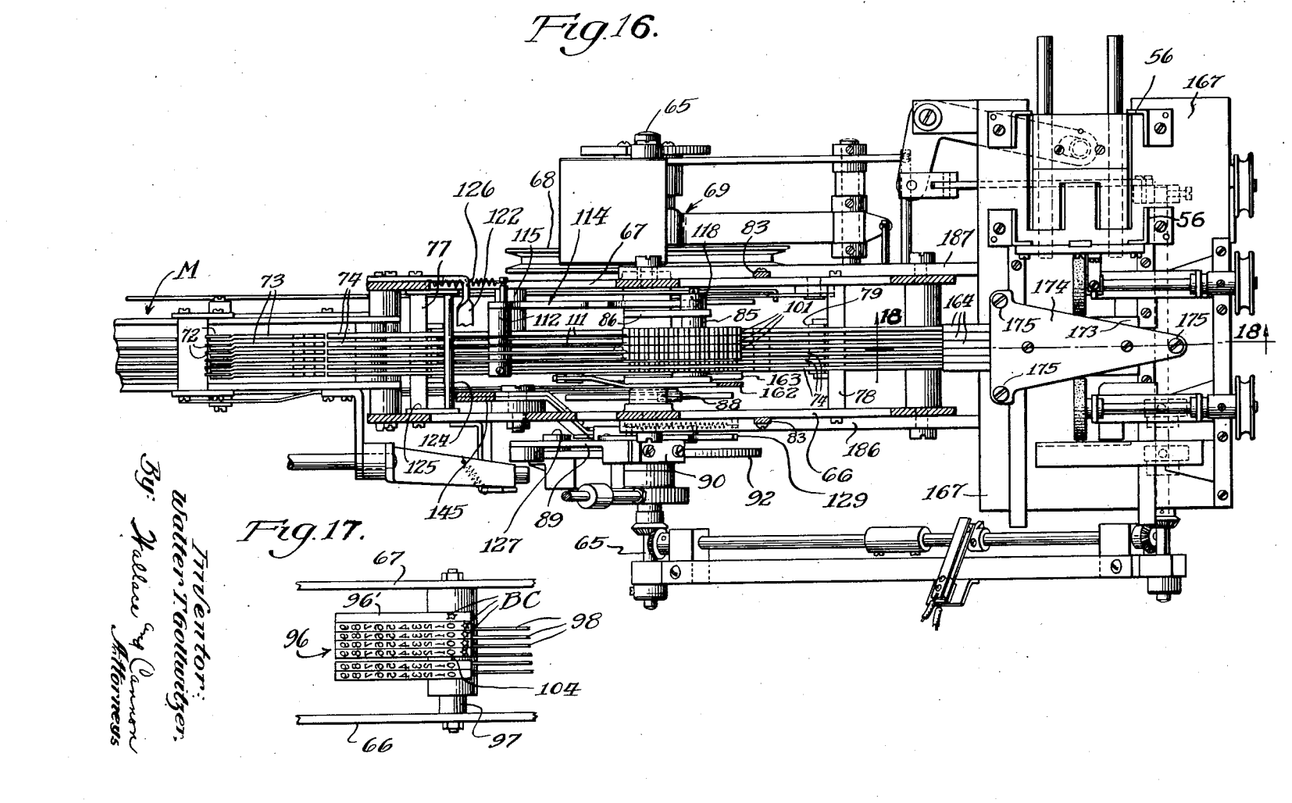
Fig. 16 is a horizontal sectional view taken on the line 16—16 on Fig. 6.
Fig. 17 is a detail plan view of the type segments of the variable printer.

As to the construction and operation of the variable printer, it should be noted first that the multiplying apparatus M includes a number of product receivers or summation members as 72, Figs. 6 and 16, which are vertically adjustable to selected positions for representing the values of the digits in the numerical quantity or product ascertained by the apparatus M. Each of these members 72 is provided with a series of horizontally extending positioning fingers 73, located one above another in vertical alignment, which are adapted to cooperate with horizontally movable sensing bars 74, Figs. 6, 9 and 16, described more in detail hereinafter, that are instrumental in setting up the variable printer. Each positioning finger as 74 has four steps 75, Fig. 6, thereon and the adjacent end of the respective sensing bar 74 has ten steps 76, Fig. 14. The steps 75 and 76 are complementarily shaped so that they may inter-engage, and it is this inter-engagement that determines the position assumed by the sensing bar 74, such positioning of the sensing bar representing a digital count. It will be understood that each sensing bar 74 and its associated receiver 72 pertain to a single order of the product or dividend amount as V, Fig. 4, which is to be printed by the variable printer. The various steps on the sensing bar 74 cooperate with the various steps on a positioning finger as 73 to represent the various digits, there being a different cooperation among the steps to represent each digit from 0 to 9, as will be explained more fully hereinafter.

Three positioning fingers 73 are provided on each receiver 72, Fig. 6, for the reason that, in the present instance, the capacity of the machine is such that a receiver 72 may be moved into a position indicative of any integer up to a maximum value of 29. However, since suitable transfer means is provided for effecting tens carry entries from each receiver 72 to the receiver 72, if any, in the next higher order, it is only necessary to utilize the units components of the amounts respectively set up on these receivers for adjusting the corresponding sensing bars 74 to positions representative of the digits in the final product. Hence, the positioning fingers 73 are so constructed and arranged that amounts having the same units components, for example, 2, 12 and 22, in the different notations 0—9, 10—19 and 20—29, respectively when set up on the receiver 72, will produce identical settings of the corresponding sensing bar 74. There being three such notations, three positioning fingers 73 are employed, one for each notation. Thus, each sensing bar 74 may be adjusted to represent the digits as 0 and 1 to 9 in a single notation only, regardless of the particular notation in which the amount actually set up on the receiver 72 falls.

Figures 12, 13, 14, 15:
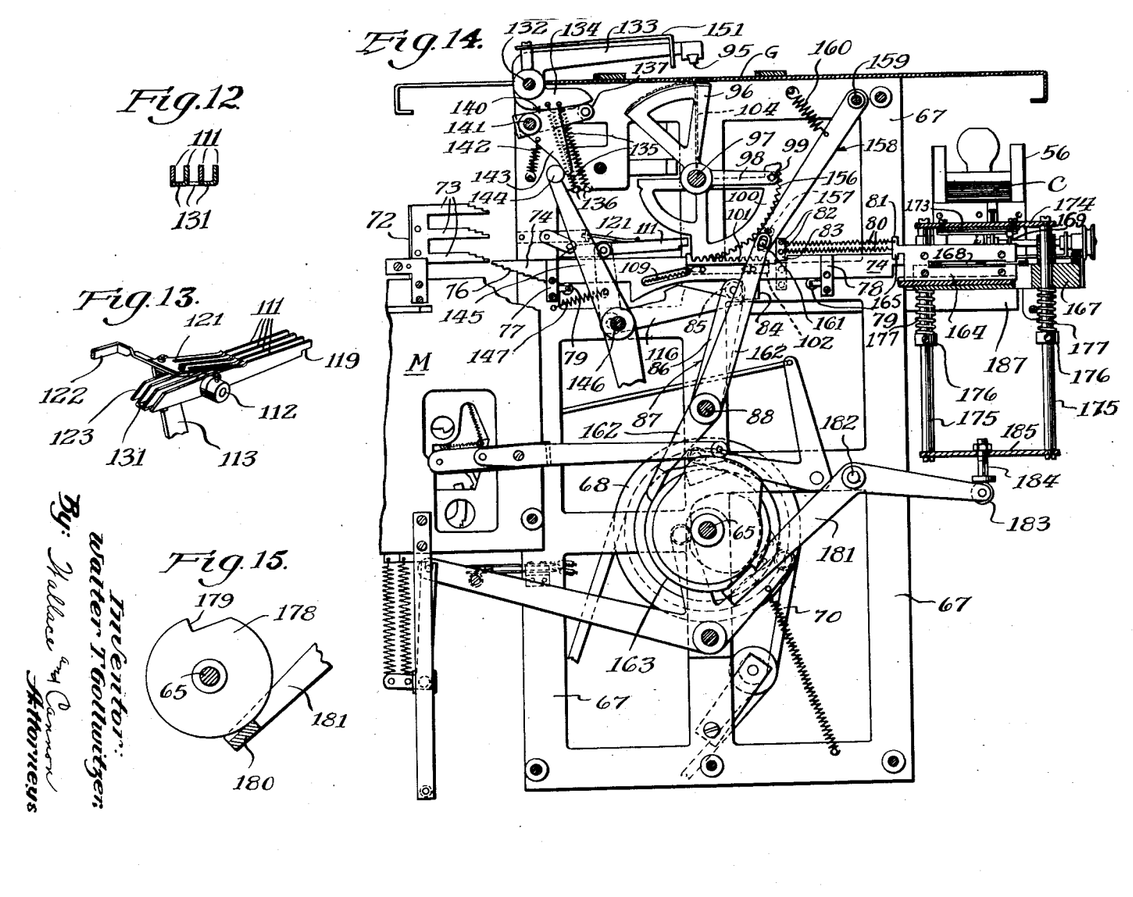
Fig. 12 is a sectional detail view taken on the line 12—12 on Fig. 9.
Fig. 13 is a perspective detail view of a spring and pawl assembly included in the mechanism shown in Fig. 9.
Fig. 14 is a vertical sectional view taken on the line 14—14 on Fig. 8.
Fig. 15 is a detail view of a cam and cam follower arrangement employed in the apparatus illustrated in Fig. 14.

The sensing bars 74 are mounted in comb blocks 77 and 78, Figs. 14 and 16, which are carried between the side frames 66 and 67 of the multiplying apparatus M. The comb blocks have as many slots therein as there are sensing bars 74, there being six such bars in the present instance as shown in Fig. 16. The slots in the comb bars 77 and 78 are deeper than the vertical height of the sensing bars 74, and mounted on each comb block beneath the bars 74 is a bracket in which a roller 79 is journaled, the upper part of the peripheries of such rollers 79 lying above the bottom of the slots in the comb blocks so that the sensing bars 74 ride on these rollers.

Figure 8:
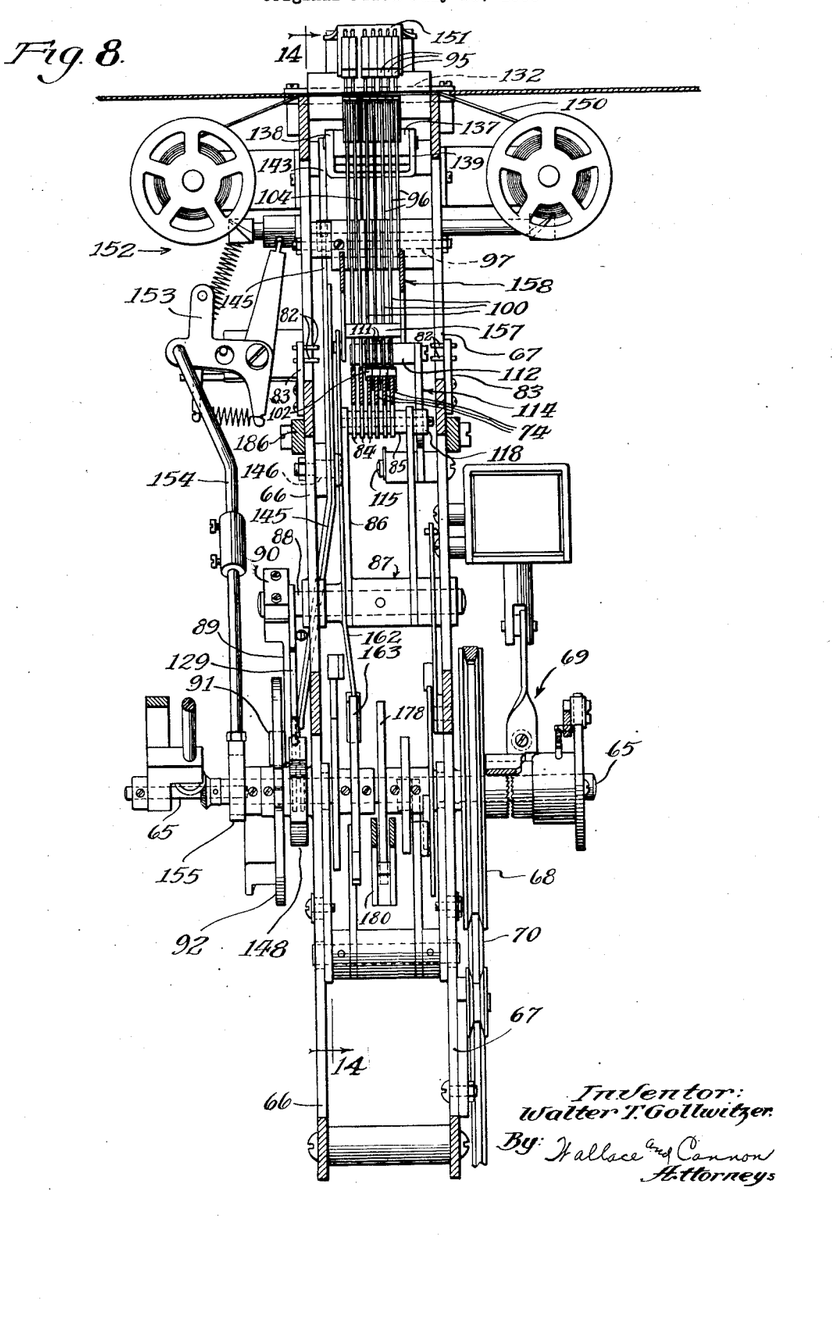
Fig. 8 is a vertical sectional view taken on the line 8—8 on Fig. 6.

The steps 76, Fig. 8, on the ends of the sensing bars 74 are adapted to be moved into cooperating relation with the steps 75 on the fingers 73 of the aligned positioning members 72 in order to determine the digital positions in which the sensing bars 74 are to be disposed, these digital positions being determined by the cooperation of the steps 76 and 75 as has been explained. The sensing bars 74 are urged toward the positioning members 73 by springs 80, Fig. 14, which are arranged in staggered relation, one end of each such spring being connected to a lug 81 on the punch slide 164 engaging the sensing bar 74, as described hereinafter, and the other end of each spring 80 being connected to a rod 82, Fig. 8, carried by blocks 83 secured to the side frames 66 and 67.

Figure 9:
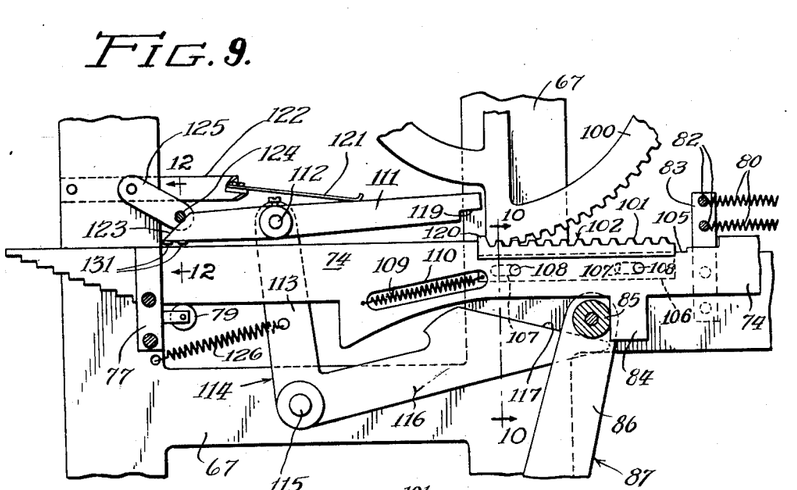
Fig. 9 is a side view, drawn to an enlarged scale, of certain parts for effecting the printing of blanking characters.

A lug 84, Fig. 9, depends from each sensing bar 74 and engages a roller 85 mounted between the arms 86 of a rocker 87, Figs. 8 and 14, that is fast on a shaft 88 journaled in the side frames 66 and 67. An arm 89, Figs. 6, 7 and 8, is fast on the shaft 65 outwardly of the side frame 66, this arm being adjustably connected to the shaft 88 by a clamp plate 90. A cam follower 91 is carried by the arm 89 and is urged into engagement with the periphery of a cam 92 by a spring 93 extended between the arm 89 and a spring anchor on the side frame 66. The cam 92 is fast on the cam shaft 65 and, as best shown in Fig. 7, a sharp drop having a substantially radially extending edge 94 is cut through this cam substantially to the hub thereof.

In the course of operation of the machine the shaft 65 rotates counterclockwise, as viewed in Fig. 7, and when the edge 94 moves into alignment with the roller 91 the spring 93 causes the shaft 88 to be rotated counterclockwise, as viewed in Figs. 6 and 7, and upon such counterclockwise movement of this shaft the roller 85 starts to move to the left, as viewed in Figs. 9 and 14, and thereupon the springs 80 urge the sensing bars 74 in a direction such that the steps 76, Fig. 8, thereon are moved into cooperating relation with the steps 75 on the positioning fingers 73. Such movement of the sensing bars 74 serves to dispose these bars in positions representative of the digits in the amount V, Fig. 4, and thereby effects setting up of the variable printer to print such amount upon a sheet S, as will be explained shortly.

Figure 10:
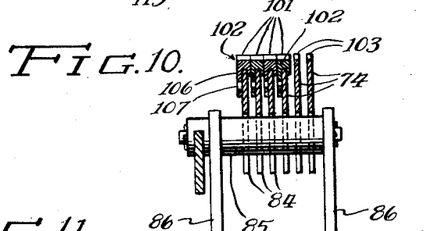
Fig. 10 is a sectional detail view taken substantially on the line 10—10 on Fig. 9.

The printing of the variable data V is effected by platens 95, Figs. 6, 8 and 14, which cooperate with type segments 96 included in the variable printer. These type segments are rotatably mounted on a stationary shaft 97 carried by the side frames 66 and 67 and are disposed adjacent respective gear segments 100 that are likewise rotatably mounted on this shaft. Each type segment has an arm 98, Fig. 14, in which an enlarged opening is provided, and a screw 99 is freely passed through this opening and is tapped into the adjacent gear segment 100 to thereby afford an adjustable connection between the gear and type segments. The gear segments 100 pertaining to the various dollar denominations of the printed amounts as V, Fig. 4, are meshed with racks 101, Figs. 9, 10 and 11, formed on blocks 102 which are slidably mounted on the respective sensing bars 74, these blocks normally being retained in fixed position relative to the sensing bars as will be presently described. The gear segments 100 pertaining to the dimes and cents order are meshed with racks 103 formed directly on the corresponding sensing bars 74. The arrangement is such that when a sensing bar 74 is moved into a position representative of zero or any of the significant digits from 1 to 9 the connected type segment 96, Figs. 14 and 17, is rocked to bring the appropriate type character into printing position beneath its platen 95 for printing the corresponding digit upon the sheet S. A pin 104, Figs. 8, 14 and 17, anchored in a collar which is fast to the shaft 97, extends upwardly to the printing plane and serves to print a period (.) between the dimes and units dollars denominations of the printed amount.

It is always desirable to print zeros in so far as dimes and cents are concerned when no significant digit appears in these orders, but in those instances where the sum of money does not extend into as many orders of dollars as there are type segments for printing orders of dollars (there being four such type segments in the present instance) it is desirable that blanking characters or symbols as stars or dollar signs be printed in those orders higher than that in which the first significant digit appears.

In the present instance each type segment 96 from which a digit in an order of dollars may be printed bears a blanking character BC, Fig 17, which in the present instance is a star. Such a star is provided on these type segments in a position beyond the zero type character thereon and means are provided for bringing these blanking characters into printing position when the need so to do arises.

It is to be noted that the blanking character printing type character BC are located in a position beyond zero position which requires, to position these characters in printing position, movement of the type segments 96 in a direction opposite to that in which such segments are moved to dispose the significant digit printing type characters thereon in printing position. However, if the sensing bars 74 were moved from their zero positions in the direction required to bring the blanking character printing type characters into printing position, then other variantly settable means such as punching means, described hereinafter and which are set up by the sensing bars, would be incorrectly positioned. Hence, in order to permit the type segments 96 to be moved in the direction required to bring the blanking character printing type characters, hereinafter referred to as the blanking characters BC, into printing position without requiring corresponding movement of the sensing bars 74, the following arrangement is provided.

The racks 101, Figs. 9, 10, 11 and 14, with which the gear segments 100 pertaining to the dollar denominations are meshed, are slidably mounted on the sensing bars 74 for limited movement relative thereto, in a direction such that when a rack 101 moves along the sensing bar 74 on which it is mounted the associated gear segment 100 acts to position the blanking character BC on the associated type segment 96 in printing position. It will be noted in Fig. 10 that the blocks 102, on which the racks 101 are formed, are bifurcated or longitudinally slotted along their lower edges so that they may straddle the upper edges of the sensing bars 74, these blocks being seated in recesses 105, Fig. 9, in the bars 74 and being movable along the sensing bars 74 between the ends of these recesses. Each block 102 has a depending leg 106 which overlies one face of the associated sensing bar 74 and which has slots 107 therein. Pins 108 extend through the slots 107 and into the adjacent bar 74 to afford a pin-and-slot connection between the block and bar. The blocks 102 are normally held in the position shown in Figs. 9 and 14 by springs 109 that are mounted in slots 110 provided in the sensing bars 74. When a blanking character BC, Fig. 17, on a type segment 96 is to be disposed in printing position, the associated block 102 is moved against the action of the connected spring 109 to impart reverse movement to the segment 96 relative to its sensing bar 74, but at all other times the springs 109 retain the blocks 102 in such position that these block move with the sensing bars 74 as if they were integral parts thereof.

The means which position the blanking characters BC in printing position include pawls as 111, Figs. 9, 11, 13 and 14, such pawls being provided only with respect to those orders that pertain to dollars, inasmuch as the blocks 102 are provided only in such orders, it being recalled that the racks 103 are directly provided in the sensing bars 74 for the orders pertaining to dimes and cents wherein 0 is printed rather than a star or blanking character. The pawls 111 are pivotally mounted on a shaft 112, carried by an arm 113, of a bell crank lever, generally indicated by 114, that is mounted on a stub shaft 115 carried by the side frame 67. The other arm 116 of the bell crank lever 114 has a cam surface 117 thereon with which there is aligned a roller 118, Figs. 8 and 11, that is mounted on the shaft carrying the roller 85. It has been explained that the roller 85 is carried by the upper ends of the arms 86 of the rocker 87, which rocker is pivoted counterclockwise, as viewed in Fig. 14, when the cam follower 91, Fig. 7, travels down the radial edge 94 on the cam 92. Shoulders 119, Figs. 9 and 13, on the pawls 111 are urged toward lugs 120 on the racks 101 by the teeth of a comb spring 121 that is carried by a bracket 122 secured to the side frame 67 as shown, for example, in Figs. 9 and 16. When the parts are in their at-rest position, however, the tapered ends 123 on the pawls 111 engage a pin 124 carried by a bracket 125 mounted on the frame of the apparatus.

Figure 11:
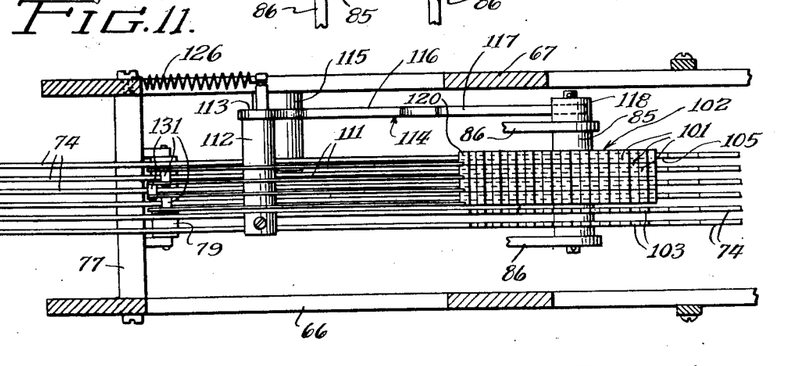
Fig. 11 is a plan view of the parts shown in Fig. 9.

The shoulders 119 and the lugs 120 are so spaced and located with respect to each other that when any dollar sensing bar 74 is moved into a position representative of a significant digit, the lug 120 on the rack 101 on this bar is disposed, to the left as viewed in Figs. 9 and 11, beyond a position in which the shoulder 119 on the aligned pawl 111 can engage such lug. When, however, a sensing bar 74 remains in its zero position, the lug 120 on the rack 101 on this bar remains substantially in the position shown in Fig. 9, in which position the shoulder 119 on the aligned pawl 111 may engage therewith, unless this pawl is rendered inoperative in a manner that will be described presently.

Each shoulder 119 is adapted to seat on a lug 120 on the aligned sliding block 102 of the corresponding sensing bar 74 in the event such bar remains in zero position at a time in the cycle of operation when this sensing bar should have attained a position representative of a significant digit, and such interrelation in timing of the parts is attained by reason of the fact that the roller 118, Fig. 11, is mounted on the rocker 87, Fig. 14, which renders the springs 80 effective to move the sensing bars 74. This roller 118 acts on the cam surface 117, Fig. 9, to pivot the bell crank lever 114 against the action of its retaining spring 126 in an amount sufficient to disengage the tapered ends 123 of the pawls 111 from the pin 124 and thereby enable the teeth of the comb spring 121 to seat the shoulders 119 on the lugs 120 on the racks 101 of those sensing bars 74 that are in zero position at the time as described above. If a shoulder 119 is seated on a lug 120, the roller 118 continues to move across the cam surface 117 and in so doing pivots the bell crank 114 in such a manner that the engaged lug 120 and the rack 101 of which it is a part are moved to the right, as viewed in Figs. 9 and 11. Such movement of the rack acts through the aligned gear segment 100 to pivot the connected type segment 96 counterclockwise, as viewed in Fig. 14, which will bring the type character for printing the blanking character BC, Fig. 17, into printing position with the aligned platen 95, and a dwell is provided on the cam surface 117 to retain the type character BC in this printing position until an impression has been made therefrom. The spring 80 acting on each sensing bar 74 is sufficiently strong in comparison with the spring 109 thereon so that relative movement of the block 102 does not affect the setting of the bar 74.

It will be recognized that the pawls 111 operate to move the racks 74 in a direction such that a blanking character BC will be brought into printing position, and the power necessary for effecting this is derived in part from the spring 93, Fig. 7. If the pawls 111 were moving several of the racks 101, the spring 93, aided by the springs 80 acting upon such of the sensing bars 74 as are unrestrained in their movement, would need overcome the effect of the several springs 109, Fig. 9. In order to avoid making the spring 93 sufficiently strong to enable this to be accomplished solely by spring tension, I have provided an arrangement whereby, at a time when the pawls 111 will be moving racks engaged thereby, direct drive may be imparted to the rocker 87 to enable the necessary number of the racks 101 to be moved. To this end a roller 127, Figs. 7 and 17, is provided on one face of the cam 92, and at the time when the racks 101 should be moved by the spring 93, this roller moves into engagement with a foot portion 128 on a lever 129, pivotally mounted on the shaft 88 and having an arm 130 fast to the rocker arm 89 which is secured to this shaft. The roller 127 remains in engagement with the foot portion 128 for a period of time sufficient to effect the necessary rearward movement of any racks 101 engaged by pawls 111, and when the racks have been moved into the rearward position to be attained thereby, which is to say, at the time the roller 118, Fig. 11, is on the dwell of the cam surface 117, Fig. 9, the roller 127 moves from the foot portion 128 and again places the rocker 87 under control of the spring 93 and the cam 92. The spring 126 acting on the bell crank 114 serves to maintain the cam surface 117 in engagement with the roller 118 and insures proper positioning of the bell crank 114 and therefore the pawls in the various operative positions attained by these parts in the operation of the machine.

Where an amount such as 103.65, for example, is to be printed, pawls 111 will act in the just described manner to dispose the type segments 96 pertaining to orders above the hundreds order of dollars in such position that the blanking characters BC, Fig. 17, thereon will cooperate with the aligned platens 95, Fig. 14. If some means were not provided for modifying the action of the pawls 111, the type segment 96 pertaining to the tens order of dollars would also be moved by the pawls 111 to dispose the blanking character BC thereon in printing position. Therefore, in such an instance where a zero is to be printed in an order below the highest order in which a significant digit appears, the pawls 111 aligned with the sensing bars 74 pertaining to such lower orders must be rendered ineffective. For this purpose each pawl 111 has a lug 131, Figs. 9, 11, 12 and 13, thereon which extends beneath the pawl 111 pertaining to the next lower order. Now it will be understood that when a lug 120 on a rack 101 passes beyond a position in which the shoulder 119 on the aligned pawl 111 can seat thereon, then the lower edge of the pawl 111 seats on the top edge of the associated lug 120 and is therefore maintained in what may well be called an inactive position. When any such pawl is retained in such an inactive position, the lug 131 thereon engages the underside of the pawl 111 cooperating with the sensing bar 74 pertaining to the next lower order, and so on down to and including the units order of dollars. The engagement of these lugs 131 with the undersides of these pawls 111 holds all of such pawls 111 in an inactive position and prevents the shoulders 119 thereon from seating on their cooperative lugs 120. Therefore those type segments 96 pertaining to orders of dollars below the highest order in which the significant digit appears, and from which no significant digits are to be printed, remain with their type characters from which 0 may be printed in position to have zeros printed therefrom. No lug 131 is provided on the pawl 111 pertaining to the units order of dollars. Moreover no pawls 111 are aligned with the sensing bars pertaining to dimes or cents; therefore 0 will always be printed by the type characters on the type segments 96 pertaining to dimes and cents when these type segments are not set to print significant digits.

A type segment 96 is provided for each sensing bar 74, but it is desirable to print a blanking character in the order above the highest order in which a significant digit will appear, this being particularly desirable in instances where checks are being printed to prevent "raising" thereof. In the present instance a type segment 96', Fig. 17, is mounted in a position to print in what would be the ten thousands order of dollars and it is retained in a stationary position in which it disposes a type character BC for printing a star, that is, a blanking character, each time the platens 95 are operated.

After an impression has been made from the type characters on the type segments 96 disposed in printing relation with the platens 95, in a manner to be described presently, the sensing bars 74 and the type segments 96 are returned to their normal at-rest positions slightly beyond the zero-representing positions thereof, and in the present instance this is effected by engagement of the roller 127, Fig. 7, with the arm 89, occurring in so far as the timing of the machine is concerned shortly after the roller 127 has moved from engagement with the foot portion 128. When the roller 127 engages the arm 89 it drives the rocker 87 in a clockwise direction, as viewed in Figs. 9 and 14, and in so doing insures that the roller 85 will engage the depending lugs 84 and return the various sensing bars 74 and the type segments 96 to their normal at-rest positions.

The pawls 111 are returned to a normal at-rest position out of engagement with the racks 101 in the course of movement of the rocker 87 clockwise, as viewed in Fig. 14, and in the course of such movement the tapered ends 123 on these pawls ride into engagement with the pin 124 which causes the pawls to ride up into the position shown in Fig. 9, which is the at-rest position thereof.

When type characters on the type segments 96 are disposed in printing position they are located with respect to the platens 95, there being a platen 95 in alignment with each type segment. These platens are carried by arms 133 which are mounted for pivotal movement about a shaft 132, and each arm 133 includes a depending portion 134, Fig. 14. Springs 135 are anchored to these arms 134 and to pins 136 extending between the side frames 66 and 67, these springs serving to urge the arms 134 into engagement with a roller 137 mounted between the arms 138 and 139, Fig. 8, of a rocker, generally indicated by 140, Fig. 14. The rocker 140 is pivoted on a shaft 141 that extends between the side frames 66 and 67, and springs 142 are effective thereon to urge an arm 143 on this rocker into engagement with an abutment 144 at the upper end of a lever 145 that is pivotally mounted on a stub shaft 146 carried by the side frame 66, Fig. 8. The lever 145 has a cam follower at the lower end thereof, and the action of a spring 147 urges this cam follower into engagement with the periphery of a cam 148 fast on the cam shaft 65, Figs. 6 and 8.

In the course of rotation of the cam shaft 65 a substantial radial edge 149 on the cam 148 moves into alignment with the cam follower on the lever 145 and thereupon the platens 95 are freed to the action of the springs 135, Fig. 14, that so act on the arms 134 thereof that the platens are snapped toward the type characters on the type segments 96 in printing position to strike a sharp blow and thereby make a clear impression from these type characters through an inked ribbon 150, Figs. 6 and 8, thus printing the variable data V, Fig. 4, on the check S. After the cam follower on the lever 145 has ridden down the edge 149, Fig. 6, a rise on the cam 148 moves into engagement with this cam follower and thereupon the platens 95 are restored to their upper at-rest position. A comb 151, Figs. 6, 8 and 14, mounted on a block carried by the side frames 66 and 67 is arranged to have the platens 95 positioned in the slots between the teeth thereof, and this serves as a guide for the platens 95 in the movement thereof to effect a printing operation. The ribbon 150 is advanced in a step-by-step manner intermediate impression-making operations of the platens 95 by a conventional ribbon feeding means generally designated 152, Figs. 6 and 8, which is actuated by a lever 153 connected by a link 154 to the strap of an eccentric 155 mounted on the cam shaft 65.

It is of course essential that the impression of the variable data V on a check S be neatly effected, and to this end it is desirable that the various characters appearing in this data be accurately aligned one with the other. Hence, notches 156, Figs. 6 and 14, are provided in the peripheries of the gear segments 100 beyond the extent of the gear teeth therein and these notches are accurately located with respect to the type characters on the type segments 96, the uniform spacing of the type characters and notches and the adjustable inter-connection between the type segments 96 and the gear segments 100 afforded by the screws 99 enabling this to be effected. A substantially V-shaped block 157, Figs. 8 and 14, extends between and ties together the arms of a rocker 158 that is pivotally mounted on a shaft 159 located near the top of the frame. A spring 160 acts on the rocker 159 to urge an apex on the V-shaped block 157 toward the notches 156 in the gear segments 100. A pin 161 is provided in one of the arms of the rocker 158 and is passed through a slot at the upper end of a lever 162, Figs. 6, 8, 14 and 16, whereby a pin and slot connection is afforded between the lever 162 and the arm carrying the pin 161. The lever 162 is mounted for pivotal movement about the shaft 88 and has a cam follower at the lower end thereof which, under the influence of the spring 160, is urged into engagement with the periphery of a cam 163, Figs. 8 and 14.

At a time in the cycle of operation after the type characters on the type segments 96 have been disposed in printing relation with the platens 95 and prior to the time these platens are freed to the action of the springs 135, a substantially radially extending edge on the cam 163 moves into alignment with the cam follower on the lever 162 and thereupon the spring 160 snaps the apex on the V-shaped block 157 into the V-shaped notches 156 related to the type characters in printing position, and, since all of these notches are engaged by the same straight-edged member and since, as has been explained heretofore, these notches are accurately positioned with respect to the type characters, it follows that the type characters on the type segments 96 are brought into accurate alignment one with the other so that a neat impression may be made therefrom.

Figures 18, 19, 20, 21:
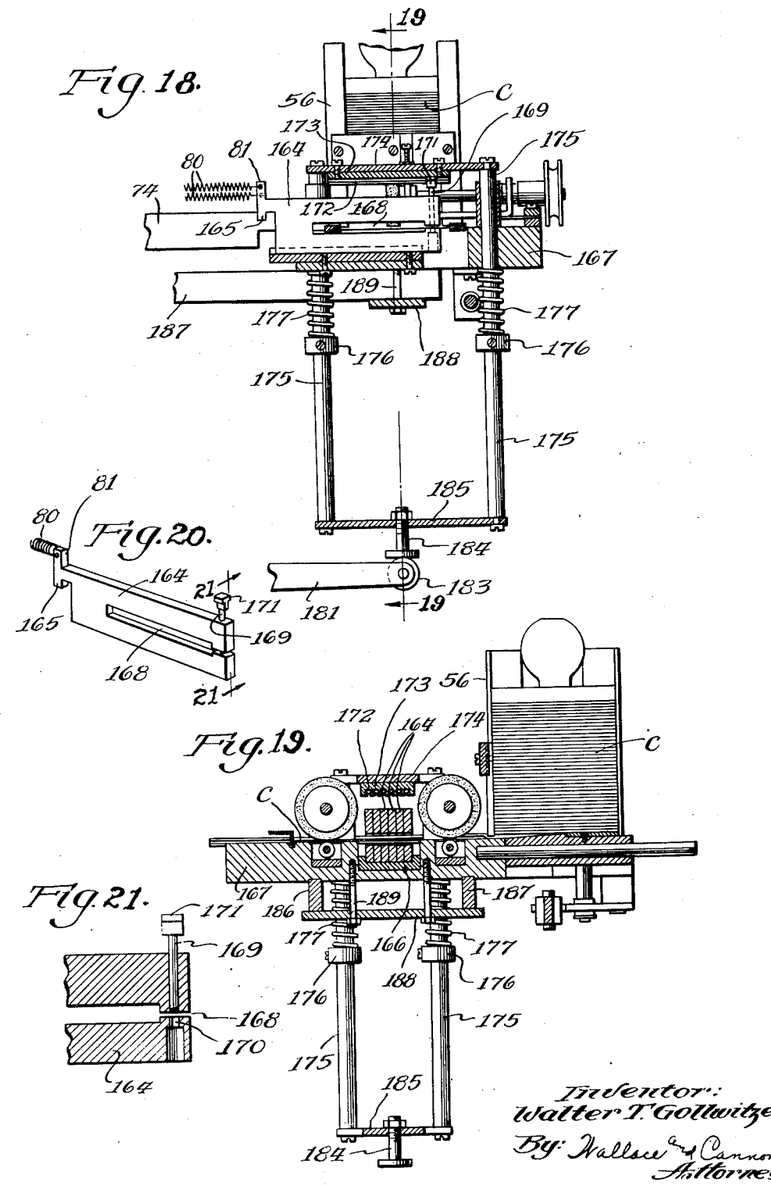
Fig. 18 is a vertical sectional view taken on the line 18—18 on Fig. 16.
Fig. 19 is a vertical sectional view taken on the line 19—19 on Fig. 18.
Fig. 20 is a perspective detail view of a punch slide employed in the mechanism illustrated in Fig. 18.
Fig. 21 is a sectional detail view taken on the line 21—21 on Fig. 20.

In the present instance the sensing bars 74 not only set up the type segments 96 so that an impression can be made from these type segments of an amount determined by an operation of the multiplying mechanism M, but a card is also perforated to thereby preserve such data in a record which is adapted to be utilized by the same or another machine in a subsequent operation. Blank cards, generally designated C, Figs. 14, 18 and 19, are stacked in the magazine 56, and one such card is withdrawn therefrom for each cycle of operation of the multiplying apparatus M. Such cards are fed into the proper relation with punch slides as 164, Figs. 18 and 20, one such punch slide being connected to an end of each sensing bar 74 by a key 165 provided on the slide 164 which fits into a complementarily formed socket in the adjacent end of the sensing bar 74. Such slides are mounted in side by side relation in a block 166, Fig. 19, which includes upstanding edges between which the punch slides 164 are mounted for relative reciprocation, the block 166 being fast in the bed plate 167 the punch unit.

Each punch slide 164 has a slot 168 extending to the free end thereof, Figs. 20 and 21, this slot being enlarged inwardly of the free end of the punch slide and being arranged to define a die face and a punch face on opposite edges thereof. A punch 169 is passed through an opening leading to the punch face of each slide 164, and a die opening 170 is formed in the die face in alignment with the punch 169. Each punch has a T-head 171 at the upper end thereof, and these T-heads are mounted for reciprocal movement in T-shaped slots 172, Fig. 19, provided in a block 173 that is carried by a plate 174 to which the upper ends of posts 175, Fig. 18, are secured, these posts extending through openings in the bed plate 167 and having collars 176 fast thereon, springs 177 being disposed about the posts 175 between the collars 176 and the bottom of the bed plate 167.

The punches 169 are operated to produce perforations in the cards C for representing variable data thereon in conventional single-hole notation. Thus, if a sensing bar 74 remains in its zero position and the punch 169 is moved toward a card disposed between this punch and the aligned die opening 170, Fig. 21, a perforation will be made in a particular row on the card in a position indicative of zero. Likewise, if a sensing bar 74 is moved into a position representative of a significant digit, the punch 169 in the connected punch slide 164 will be moved across the column on the card aligned therewith to produce a perforation in this column in a particular row across the card at a position indicative of whatever digital value the connected sensing bar 74 is set to represent.

Thus in the course of operation of the multiplying mechanism M, a card C is fed into association with the punches in the slides 164, as shown in Fig. 19, and after it has come to rest to dispose the various columns thereon, in which perforations representative of digits are to be made, in a predetermined relation with the punches, the sensing bars 74 are operated in the manner above described to be disposed in digit-representing positions. Then, after the bars have been disposed in such positions, which of course correspondingly positions the punches 169, these punches are operated to produce the proper perforations in the card C.

Such operation of the punches 169 is effected by a cam 178, Figs. 8 and 15, fast on the cam shaft 65 and having a substantially radially extending edge 179 therein. In the course of rotation of the cam 178 with the cam shaft 65, the radial edge 179 moves into alignment with a cam follower 180 on a lever 181. The lever 181 is pivotally mounted at 182, Fig. 14, on the side frame 67 and has a roller 183 at the end thereof opposite the end at which the cam follower 180 is formed, this roller engaging the flat head of a screw 184 that is fast to a plate 185 attached to the lower ends of the posts 175.

At the time the cam follower 180 rides down the edge 179, Fig. 15, the springs 177, Figs. 14, 18 and 19 act on the collars 176 and force the plate 174 and the block 173 downwardly and thereupon the punches 169 are forced downwardly to perforate the card C. When the rise on the cam 178 engages the cam follower 180, the roller 183 acts on the screw 184 and forces the posts 175 upwardly and thereupon the punches 169 are retracted back up into the slides 164 and thereafter the card C that has been perforated by the descent of the punches 169 is ejected from the aligned slots 168.

The bed plate 167 of the punch unit is supported in position to dispose the block 166, Fig. 19, thereon in such position that the punch slides 164 will be aligned with the sensing bars 74 and to this end two bars 186 and 187, Figs. 6, 16 and 19, are secured to the outer faces of the side frames 66 and 67, respectively, and these bars are fitted into keyways formed in the bottom of the bed plate 167. These keyways are located accurately with respect to the location of the block 167, and the connection of the bars 186 and 187 to the side frames 66 and 67 insures accurate positioning of the punch slides 164 in alignment with the sensing bars 74. In order that the digital positions in which the punches come to rest under control of the sensing bars 74 may be accurately located with respect to the cards, the bed plate 167 is clamped onto the bars 186 and 187, and to this end a clamp plate 188, Figs. 18 and 19, is disposed on the under sides of these bars, bolts 189 being passed through this clamp plate and being threaded into the bed plate 167, the adjustable mounting resulting from this clamping permitting the necessary adjustment.

Any suitable means may be employed for feeding the cards C from the magazine 56 to punching position and thence through the guideway 57, Fig. 1, such a means being disclosed in my aforesaid copending application Serial No. 221,841.

As is apparent from the foregoing description, my novel variable data recording means embodies several advantageous features and constitutes a substantial improvement over prior apparatus of this character. Thus, provision has been made for setting up the type segments 96 with a minimum of delay by so arranging the means which functions to suppress the printing of zeros and to dispose blanking characters on selected type segments in printing position to the left of the highest significant digit, that these operations are carried out while the other type segments are being set up by the sensing bars 74 instead of awaiting the completion of the advancing movement of these sensing bars. Moreover, the adjustment of a type segment 96 to its blanking position does not disturb the zero setting of the related sensing bar; hence other recording elements, such as the punches 169, which are required to remain in their true zero positions when no significant digit is to be recorded thereby, may be correctly set up by the sensing bars 74 irrespective of the adjustment of the type wheels 96 to their blanking positions. It will be understood that still other or additional variantly settable devices, such as a list printer or an accumulator, could be expeditiously arranged to be set up by the sensing bars 74, in the manner shown for example in my United States patent, No. 2,133,136, or in my aforesaid co-pending application, Serial No. 221,841.

While the present invention has been described as being adapted for use in conjunction with a machine in which calculations based upon data derived from printing and control devices are performed and the results thereof recorded, it may be equally well employed in a machine for merely transcribing variable data that are represented on such devices. Furthermore, it may operate under the control of control devices such as record cards as well as being responsive to the control areas on printing and control devices. It should also be noted that the invention is not limited to use in a record-controlled machine and may be employed to advantage in manually operable business machines as well.

Thus, while I have illustrated and described a selected embodiment of my invention, it is to be understood that this is capable of variation and modification and I therefore do not wish to be limited to the precise details set forth but desire to avail myself of such changes and alterations as fall within the purview of the following claims.

I claim:

1. In a machine of the character described having amount manifesting means, the combination of sensing elements movable through normal sensing movements to cooperate with said amount manifesting means, each of said sensing elements being arranged to sense one order of an amount manifested, members respectively mounted on said sensing elements and capable of limited movement relative thereto, means operable upon all of said members pertaining to the orders higher than the highest order in which a significant digit is manifested to impart to each last-named member movement relative to its element, symbol printing means, and type segments settable by such relative movements of said members to set said symbol printing means in printing position.

2. In a machine for producing business instruments or the like and which has an amount manifesting means, the combination of a variable printing means including rockable type segments for the various order of the amounts to be manifested, each of said type segments including type faces representing the significant digits and zero, a plurality of sensing elements movable in one direction from a normal position for cooperative association with said amount manifesting means, members slidably mounted on said elements and geared to said type segments, means yieldingly retaining said members against movement relative to said elements in a direction the reverse of that in which said elements are adapted to be moved for cooperating with said amount manifesting means, whereby movement of any of said elements from its normal position serves to actuate the related type segment through the medium of the associated slidable member into a position to dispose a significant digit-representing type character in printing position, means operable upon at least some of the members mounted on elements which are not moved from said normal position to shift such members in said reverse direction against the action of said yieldable retaining means, and symbol-printing means on said segments positionable in printing position by such reverse movement.

3. In a variable printer operable under control of a variantly settable governing means, a plurality of rectilinearly movable elements mounted in side by side relation, a plurality of rotatable printing members mounted in side by side relation respectively adjacent said elements, each of said printing members carrying a series of type characters pertaining to the digits 0 and 1 to 9 and a special blanking character thereon, blocks slidably mounted on said elements and geared respectively to the adjacent printing members, yieldable means for normally retaining said blocks in fixed position relative to the respective elements, positioning means operable to dispose said elements in selected digit-representing positions relative to a predetermined zero-representing position in accordance with the setting of said governing means to thereby dispose selected type characters on said printing members in printing position, variantly settable recording punches connected to said elements for movement therewith into selected positions corresponding to the settings of said printing members, and means effective when less than all of said elements are moved away from said zero-representing position upon operation of said positioning means to impart movement to at least some of the blocks on such elements for thereby disposing the blanking characters on the connected printing members in printing position, said yieldable means enabling such blocks to move relative to said elements without affecting the settings of said punches.

4. In a machine for producing business instruments or the like and which has an amount manifesting means including a plurality of elements respectively allocated to the denominations of a numerical amount and differentially positionable to set up representations of the digits in such denominations, the combination of, a plurality of movable sensing members respectively associated with said elements and disposed for sensing cooperation therewith, yielding means for moving said sensing members from normal zero positions into sensing cooperation with said elements to sense an amount represented thereby and operative to impart varying amounts of movement to such members in accordance with the values of the respective digits in such amount, a restoring member operable in one direction to engage and restore said sensing members to their zero positions and operable when moved in the other direction to release said sensing members for movement into sensing cooperation with said elements, a variable printing mechanism including a plurality of differentially positionable printing members having type characters for printing the digits of a numerical amount, at least some of said printing members also being provided with blanking characters, means normally connecting said printing members respectively to said sensing members for conjoint movement therewith and including parts having yielding lost motion connections with said sensing members, pawls mounted for engagement with said parts when the associated sensing members are in their zero positions, a movable carrier upon which said pawls are mounted for movement through an operative stroke wherein the engaged pawls actuate the engaged parts and the associated printing members into position to print from the blanking characters thereof, and means on said carrier and including a cam surface engageable by said restoring member when it moves in said other direction to impart such operative stroke to said pawls.

5. In a machine for producing business instruments or the like and which has an amount manifesting means differentially positionable to set up representations of the digits of a multi-digit numerical amount, a plurality of movable sensing members disposed for sensing cooperation with said amount manifesting means, yielding means for moving said sensing members from normal zero into cooperation with said manifesting means to sense an amount represented thereby and operative to impart varying amounts of movement to such members in accordance with the values of the respective digits in such amount, a restoring member operable in one direction to engage and restore said sensing members to their zero positions and operable when moved in the other direction to release said sensing members for movement into sensing cooperation with said elements, a variable printing mechanism including a plurality of differentially positionable printing members having type characters for printing the digits of a numerical amount, at least some of said printing members also being provided with blanking characters, means normally connecting said printing members respectively to said sensing members for conjoint movement therewith and including parts mounted on said members for sliding movement thereon and having yielding lost motion connections with said sensing members, pawls mounted for engagement with said parts when the associated sensing members are in their zero positions, a rocking carrier upon which said pawls are mounted for movement from a retracted position through an operative stroke wherein the engaged pawls actuate the engaged parts and the associated printing members into position to print from the blanking characters thereof, cam means operable on said pawls to retract the same, and means on said rocking carrier and including a cam surface engageable by said restoring member when it moves in said other direction to impart such operative stroke to said carrier and said pawls.

6. In a machine for producing business instruments or the like and which has an amount manifesting means differentially positionable to set up representation of the digits of a multi-digit numerical amount, a plurality of movable sensing members disposed for sensing cooperation with said manifesting means, yielding means for moving said sensing members from normal zero into cooperation with said manifesting means to sense an amount represented thereby and operative to impart varying amounts of movement to such members in accordance with the values of the respective digits in such amount, a restoring member operable in one direction to engage and restore said sensing members to their zero positions and operable when moved in the other direction to release said sensing members for movement into sensing cooperation with said elements, a variable printing mechanism including a plurality of differentially positionable printing members having type characters for printing the digits of a numerical amount, at least some of said printing members also being provided with blanking characters, means normally connecting said printing members respectively to said sensing members for conjoint movement therewith and including parts slidably mounted on the respective sensing members and having yielding lost motion connections with said sensing members, pawls mounted for engagement with said parts when the associated sensing members are in their zero positions, a rocking carrier operable through a predetermined stroke and upon which said pawls are mounted for rocking movement between inactive and active positions, cam means operable when said carrier is at one end of its stroke to maintain said pawls in their inactive positions, spring means urging said pawls to their active positions, and means on said carrier and including a cam surface engageable by said restoring member when it moves in said other direction to impart an operative stroke to said carrier to release said pawls from the action of said cam means to thereby actuate at least certain of said parts and the associated printing members to print from the blanking characters thereof.

WALTER T. GOLLWITZER.